US009703103B2

(12) United States Patent
Araki et al.

(10) Patent No.: US 9,703,103 B2
(45) Date of Patent: Jul. 11, 2017

(54) HEAD-MOUNTED DISPLAY

(71) Applicant: Sony Interactive Entertainment Inc., Tokyo (JP)

(72) Inventors: Takamasa Araki, Tokyo (JP); Fumihiko Sato, Tokyo (JP); Tateno Takayuki, Chiba (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/123,739

(22) PCT Filed: Feb. 27, 2015

(86) PCT No.: PCT/JP2015/055920
§ 371 (c)(1),
(2) Date: Sep. 6, 2016

(87) PCT Pub. No.: WO2015/137165
PCT Pub. Date: Sep. 17, 2015

(65) Prior Publication Data
US 2017/0017085 A1      Jan. 19, 2017

(30) Foreign Application Priority Data

Mar. 14, 2014   (JP) .................................. 2014-052711

(51) Int. Cl.
*G02B 27/02*   (2006.01)
*G02B 7/02*    (2006.01)
(Continued)

(52) U.S. Cl.
CPC ........... *G02B 27/028* (2013.01); *G02B 7/021* (2013.01); *G02B 27/0176* (2013.01);
(Continued)

(58) Field of Classification Search
CPC ...... G02B 7/002; G02B 7/021; G02B 23/125; G02B 23/16; G02B 27/0176;
(Continued)

(56) References Cited

U.S. PATENT DOCUMENTS 6,115,846 A * 9/2000 Truesdale ............. A42B 3/042
                                                    2/171.3
6,392,798 B1 * 5/2002 Newkirk ............ G02B 27/0176
                                                     345/8
(Continued)

FOREIGN PATENT DOCUMENTS

JP     08265670 A     10/1996
JP     09304724 A     11/1997
(Continued)

OTHER PUBLICATIONS

International Preliminary Report for corresponding PCT Application No. PCT/JP2015/055920, 14 pages, dated Sep. 22, 2016.
(Continued)

*Primary Examiner* — Loha Ben
(74) *Attorney, Agent, or Firm* — Matthew B. Dernier, Esq.

(57) ABSTRACT

There is provided a head-mounted display which allows the lengths of fastening bands to be adjusted easily and can be mounted on the head of the user with increased stability. The head-mounted display has a first fastening band and a second fastening band which extend from the front side toward rear side thereof, for being fastened to the head of the user. At least a portion of the first fastening band is made of an elastically expandable material. The second fastening band is made of a material which is less expandable than the material of the first fastening band and includes a mechanism for adjusting the length thereof.

6 Claims, 12 Drawing Sheets

(51) Int. Cl.
*G02B 27/14* (2006.01)
*G09G 5/00* (2006.01)
*G02B 27/01* (2006.01)

(52) U.S. Cl.
CPC .............. *G02B 27/022* (2013.01); *G09G 5/00* (2013.01); *G02B 2027/0158* (2013.01); *G02B 2027/0159* (2013.01)

(58) Field of Classification Search
CPC ................ G02B 27/022; G02B 27/028; G02B 2027/0154; G02B 2027/0158; G02B 2027/0159; G02B 2027/0178; G09G 5/00; G06F 1/163; G06F 3/011
USPC ............ 359/630, 632, 634, 804; 361/679.02, 361/679.03, 679.21, 679.58; 345/7, 8; 351/158
See application file for complete search history.

(56) References Cited

U.S. PATENT DOCUMENTS

| | | | |
|---|---|---|---|
| 6,515,853 B2* | 2/2003 | Saito | G06F 3/011 349/58 |
| 6,785,046 B2* | 8/2004 | Newkirk | G02B 23/125 359/399 |
| 2013/0335536 A1 | 12/2013 | Kura | |

FOREIGN PATENT DOCUMENTS

| | | |
|---|---|---|
| JP | 11075142 A | 3/1999 |
| JP | 2002247482 A | 8/2002 |
| WO | 2012121129 A1 | 9/2012 |

OTHER PUBLICATIONS

International Search Report for corresponding PCT Application No. PCT/JP2015/055920, 4 pages, dated May 19, 2015.

* cited by examiner

FIG.4
(a)
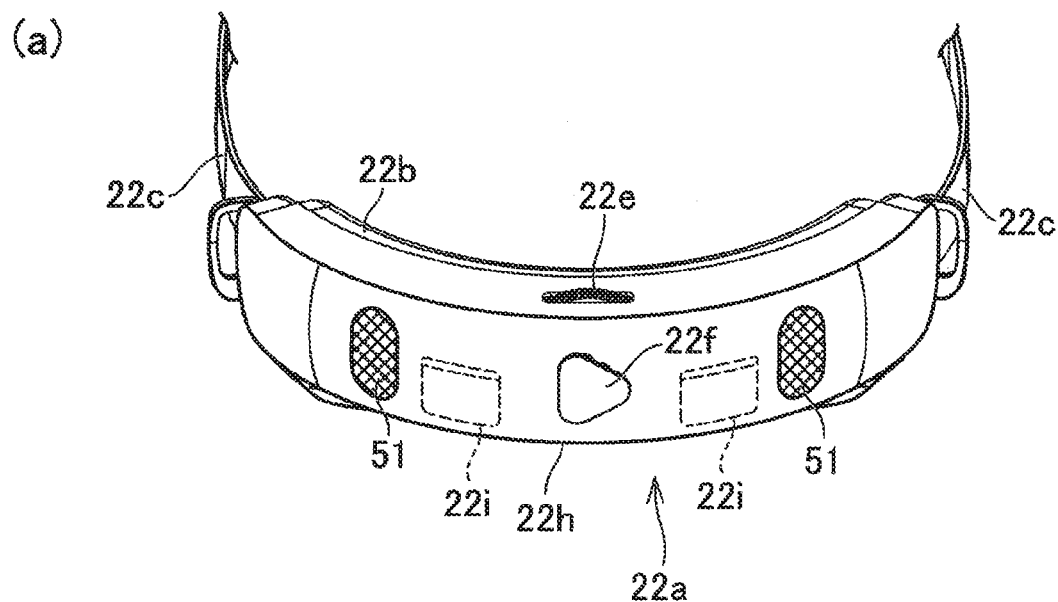
(b)
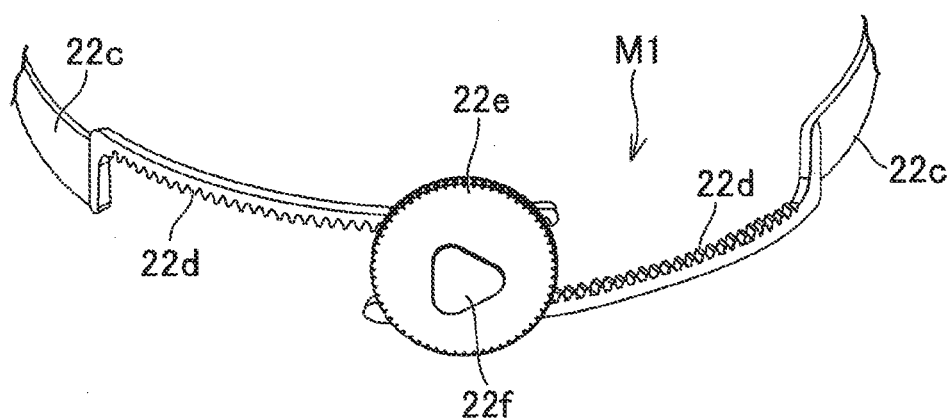

FIG.11
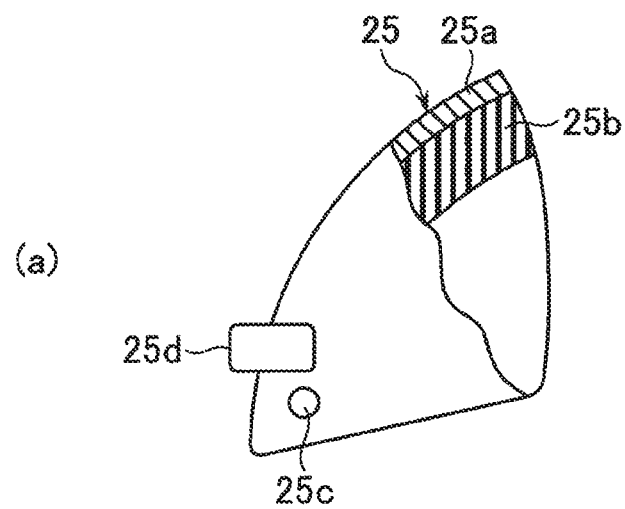
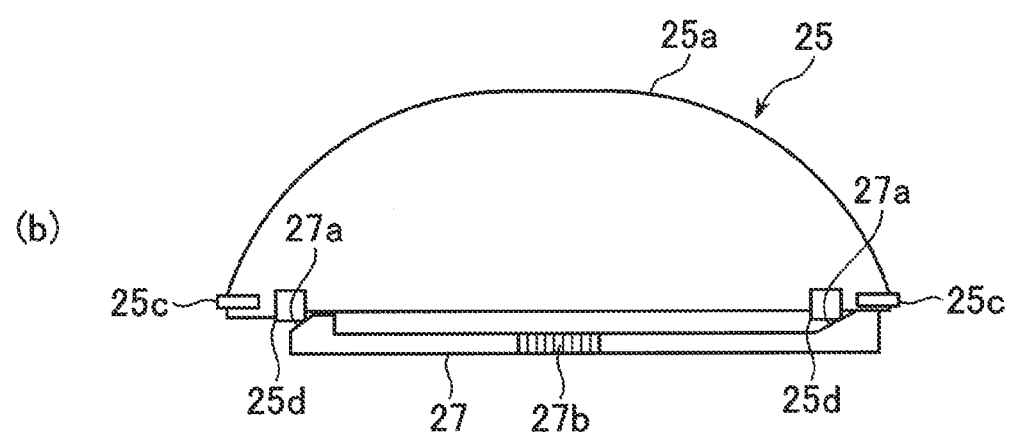

HEAD-MOUNTED DISPLAY

TECHNICAL FIELD

The present invention relates to a head-mounted display.

BACKGROUND ART

Heretofore, the development of a head-mounted display to be mounted on the head of a user for use has been underway (the head-mounted display will hereinafter be referred to as "HMD"). The HMD includes a display unit having a display device for being placed in front of the eyes of the user and a mount to be mounted on the head of the user, the mount supporting the display unit. Some HMDs have a fastening band for sandwiching the head of the user along the anterior-posterior directions (e.g., Japanese Patent Laid-open No. Hei 09-304724).

SUMMARY

Technical Problem

Some of the HMDs have a mechanism incorporated in the fastening band for adjusting the length of the fastening band. When the user matches the length of the fastening band to the size of its own head, the HMD is stably supported on the head. However, the conventional HMDs have a problem in that the process of adjusting the length of the fastening band is cumbersome. For example, if the length of the fastening band does not fit the head of the user, then the user attempts to adjust the length of the fastening band while the HMD is being mounted on the head. However, since the HMD tends to change in position or attitude during the adjusting process, the adjusting process becomes cumbersome.

Solution to Problem

A head-mounted display according to the present invention includes a first fastening band for being fastened to the head of the user, the first fastening band including at least a portion made of an elastically expandable material and extending rearwardly from a front side of the head-mounted display, a second fastening band for being fastened to the head of the user, the second fastening band being made of a material which is less expandable than the material of the first fastening band, including a mechanism for adjusting the length thereof, and extending rearwardly from a front side of the head-mounted display, and a display unit including a display device and supported by the first fastening band and the second fastening band.

The head-mounted display thus constructed allows the lengths of the fastening bands to be adjusted easily and can be mounted on the head of the user with increased stability.

BRIEF DESCRIPTION OF DRAWINGS

FIG. 4 is a set of views illustrating a rear support of a second fastening band, FIG. 4(a) being a view of a rear side of the rear support and FIG. 4(b) a view illustrating a length adjusting mechanism for the second fastening band.

FIG. 11 is a set of views illustrating an example of a structure for making it possible to adjust the angle of a front pad.

DESCRIPTION OF EMBODIMENT

Figure 1:
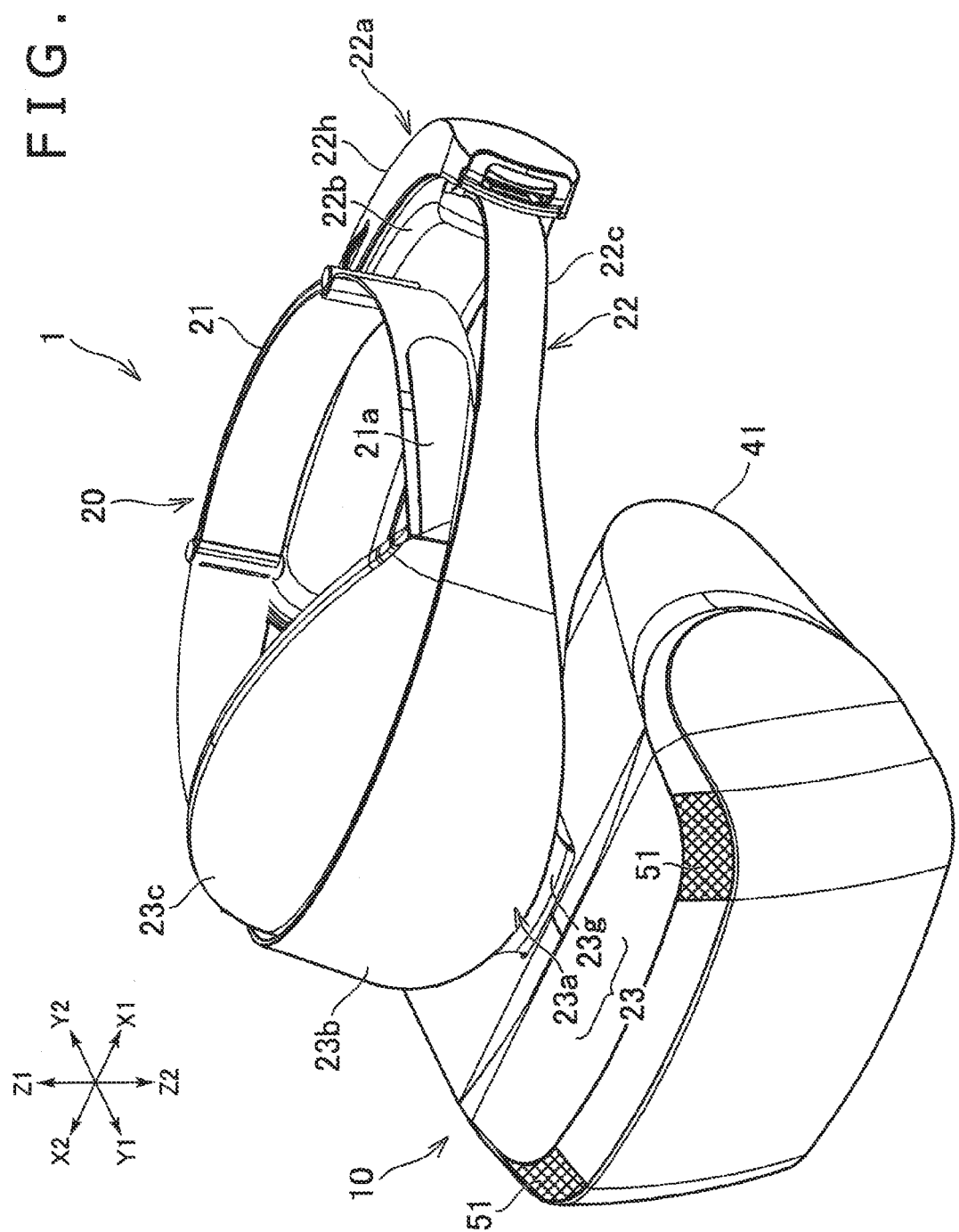
FIG. 1 is a perspective view of a head-mounted display according to an embodiment of the present invention.
Figure 2:
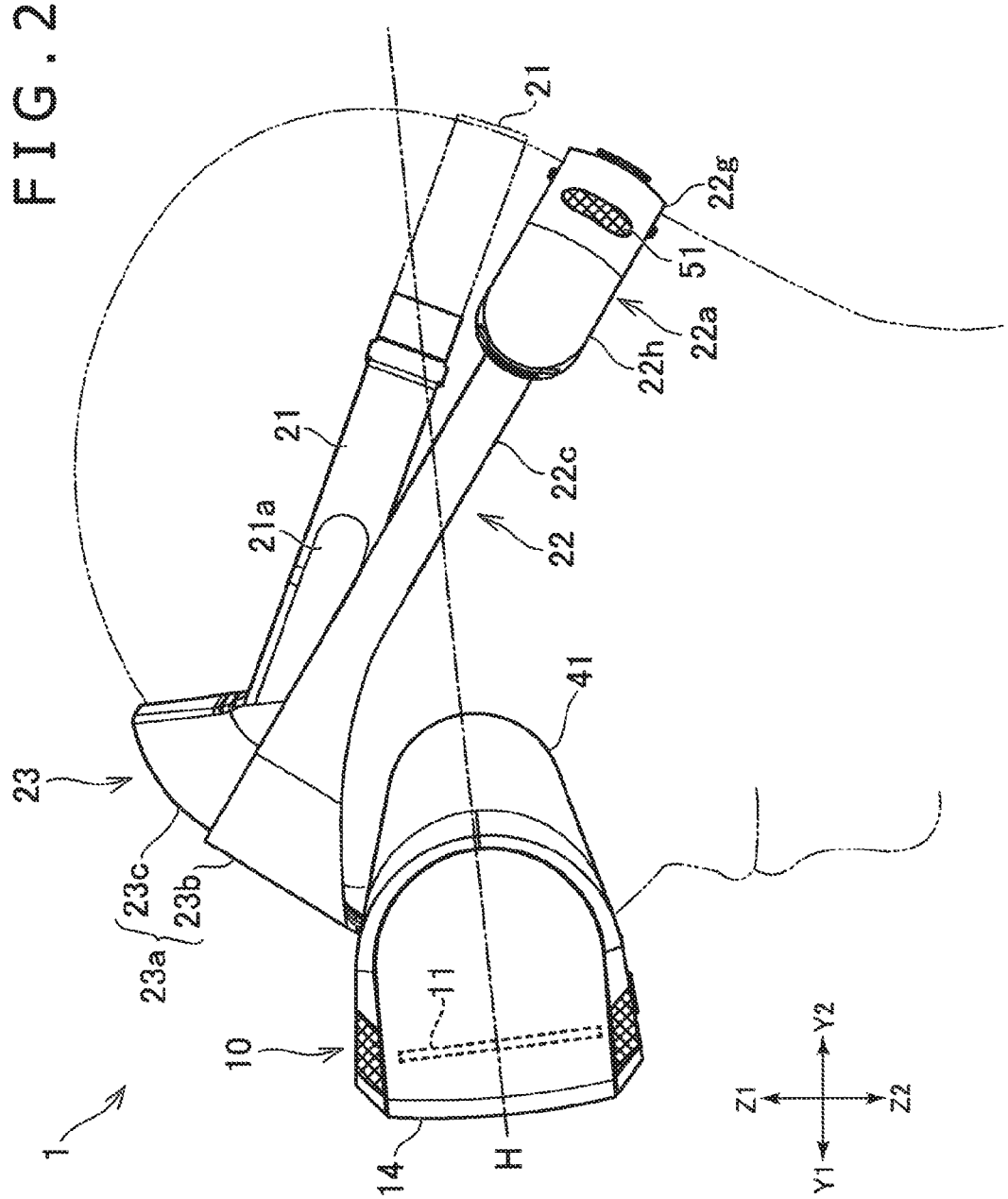
FIG. 2 is a side elevational view of the head-mounted display.
Figure 3:
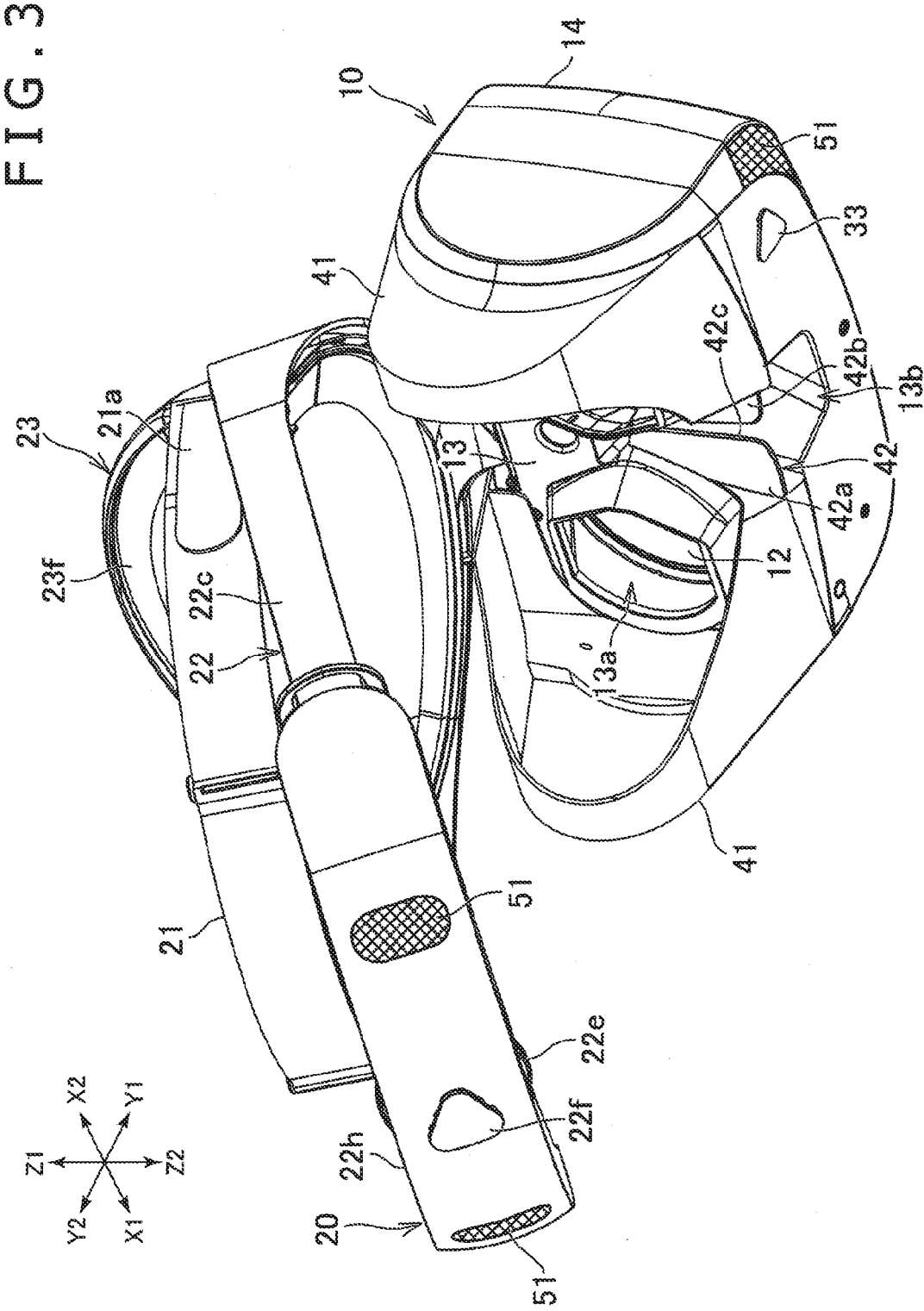
FIG. 3 is a perspective view of the head-mounted display as viewed from an angle different from that of FIG. 1.

An embodiment of the present invention will be described below with reference to the drawings. FIGS. 1 through 3 are views illustrating a head-mounted display 1 according to the embodiment of the present invention (the head-mounted display will hereinafter be referred to as "HMD"). FIG. 1 is a perspective view, FIG. 2 is a side elevational view, and FIG. 3 is a perspective view of the HMD 1 as viewed from an angle different from that of FIG. 1. FIG. 4 is a set of views illustrating a rear support 22a of a second fastening band 22 to be described later, FIG. 4(a) being a view of a rear side of the rear support 22a and FIG. 4(b) a view illustrating a length adjusting mechanism M1 for the second fastening band 22.

In the description which follows, Y1 and Y2 illustrated in the above figures represent an anterior direction and a posterior direction, respectively, X1 and X2 a leftward direction and a rightward direction, respectively, and Z1 and Z2 an upward direction and a downward direction, respectively.

The HMD 1 has a display unit 10 including a display device 11 (see FIG. 2) on its front side. The display device 11 displays three-dimensional images. For example, the display device 11 displays an image for the right eye in its right area and an image for the left eye in its left area. The display device 11 may display three-dimensional images in a frame sequential format. The images displayed by the display device 11 are not limited to three-dimensional images, but may be two-dimensional images. The display device 11 may include a liquid crystal display device or an organic electroluminescence (EL) display device, but is not limited to any particular types. In an example of the HMD 1, as illustrated in FIG. 2, the display device 11 may be inclined with respect to a front surface of the display unit 10 or a rear surface of the display unit 10 (a surface facing the face of the user). As illustrated in FIG. 3, the display unit 10 may have lenses 12 (see FIG. 3) for increasing the viewing angle of the display device 11. The display unit 10 has a frame 13 (see FIG. 3) that supports the display device 11 and the lenses 12, and a box-shaped housing 14 (see FIG. 1) which houses therein the display device 11, the lenses 12, and the frame 13.

As illustrated in FIG. 1, the HMD 1 has a mount 20 for being mounted on the head of the user. The mount 20 has a first fastening band 21 and a second fastening band 22 which extend from the front side toward rear side of the HMD 1 and support the display unit 10. As illustrated in FIG. 2, the fastening bands 21 and 22 extend around the periphery of the head of the user when the HMD 1 is in use. The fastening bands 21 and 22 are placed on a rear side of the head of the user. The mount 20 has a front support 23 to be described later. The front support 23, the first fastening band 21, and the second fastening band 22 sandwich the head of the user along the anterior-posterior directions. In the example illustrated in FIGS. 1 through 3, the fastening bands 21 and 22 extend rearwardly from the front support 23. In a plan view of the HMD 1, the front support 23 and the first fastening band 21 are of an annular shape, and the front support 23 and the second fastening band 22 are also of an annular shape.

At least a portion of the first fastening band 21 is made of an elastically expandable material. The first fastening band 21 can elastically be expanded in its lengthwise direction as its material is expanded. In other words, when the material of the first fastening band 21 is expanded, the size of the annular shape made up of the front support 23 and the first fastening band 21 is varied. The second fastening band 22 is made of a material which is less expandable than the material of the first fastening band 21. As described later, the second fastening band 22 has a mechanism M1 (see FIG. 4) for adjusting its length. As a result, when the mechanism M1 adjusts the length of the second fastening band 22, the size of the annular shape made up of the front support 23 and the second fastening band 22 is adjusted. When the user is to mount the HMD 1 on its own head, the user initially tentatively secures the position and attitude of the HMD 1 using the first fastening band 21, and then can adjust the length of the second fastening band 22 while the HMD 1 is being tentatively secured. Therefore, when the user adjusts the length of the second fastening band 22, the position and attitude of the HMD 1 is prevented from being varied, allowing the user to adjust the length of the second fastening band 22 easily. For example, since the HMD 1 is tentatively secured by the first fastening band 21, the user can adjust the length of the second fastening band 22 using its both hands. Furthermore, as the second fastening band 22 is made of a material less expandable than the first fastening band 21, the second fastening band 22 is mounted on the head of the user with increased stability.

When the first fastening band 21 is in its free state (when the elastic material thereof is not expanded), the first fastening band 21 is positioned within the second fastening band 22. When the user is to use the HMD 1, the user elastically expands the first fastening band 21, increasing the size of the annular shape made up of the first fastening band 21 and the front support 23, so that the user can mount them on the head. Thereafter, the user operates the mechanism M1 to adjust the length of the second fastening band 22, reducing the size of the annular shape made up of the second fastening band 22 and the front support 23, so that the user can secure them on the head.

The material of the first fastening band 21 may be rubber, for example. An example of the material of the second fastening band 22 is a resin such as plastics. The material of the second fastening band 22 may be a metal. Preferably, the material of the second fastening band 22 is not only less expandable than the material of the first fastening band 21, but also more rigid than the material of the first fastening band 21.

According to an example of the HMD 1, the first fastening band 21 is made of an elastically expandable material in its entirety. According to another example of the HMD 1, only a portion of the first fastening band 21 may be made of an elastically expandable material so that the first fastening band 21 can be expanded in its lengthwise direction. For example, the first fastening band 21 may have an unexpandable portion (a portion held against the rear side of the head of the user) in its rear portion, and side portions (portions held against the right and left sides of the head of the user) made of an expandable material.

As described above, the second fastening band 22 has the mechanism M1 for adjusting the length thereof (the mechanism M1 will hereinafter be referred to as "length adjusting mechanism"). In the example illustrated in FIG. 2, the second fastening band 22 has a rear support 22*a* in its rear portion which is held against the rear side of the head of the user. The rear support 22*a* has a case 22*h* housing the length adjusting mechanism M1 (see FIG. 4(*b*)) therein. The rear support 22*a* preferably has a cushion 22*b* (see FIG. 1) on an inner surface thereof (a surface to be held against the rear side of the head of the user).

The second fastening band 22 in the example described herein has left and right frames 22*c*. The frames 22*c* are made of the material (e.g., plastics) which is less expandable than the material of the first fastening band 21, as described above. The left and right frames 22*c* extend from the front side to rear side of the HMD 1, and are connected respectively to the left and right ends of the rear support 22*a*. In the example described herein, the frames 22*c* extend rearwardly from the right and left sides of the front support 23 and have rear portions fitted in the case 22*h* of the rear support 22*a*.

The length adjusting mechanism M1 is preferably arranged such that the rear support 22*a* will move equally with respect to the left and right frames 22*c*. With this arrangement, the position of the rear support 22*a* is prevented from being shifted to the right or left. According to an example of the HMD 1, as illustrated in FIG. 4(*b*), racks 22*d* are formed on rear portions of the frames 22*c*. The rack 22*d* of the right frame 22*c* and the rack 22*d* of the left frame 22*c* are disposed so as to face each other in the vertical, namely up-down directions. The rear support 22*a* includes a rotatable operating member 22*e* (the operating member 22*e* will hereinafter be referred to as "length adjusting member"). The length adjusting member 22*e* is disposed between the racks 22*d* of the two frames 22*c*, and a gear (not illustrated) engaging the racks 22*d* is coupled to the length adjusting member 22*e*. According to this structure, when the gear rotates, the rear support 22*a* moves equally with respect to the left and right frames 22*c*, causing the right and left portions of the second fastening band 22 to contract or expand equally. In other words, the rear support 22*a* moves along the anterior-posterior directions equally with respect to the left and right frames 22*c*. The length adjusting member 22*e* is coupled to both of the two frames 22*c*. Specifically, the gear of the length adjusting member 22*e* is held in engagement with both of the gears of the two frames 22*c*. Therefore, since the position of the rear support 22*a* with respect to both of the two frames 22*c* can be adjusted simply by operating the single length adjusting member 22*e*, the process of adjusting the length of the second fastening member 22 is made easy. As a result, the size of the annular shape made up of the front support 23 and the second fastening band 22 can easily be adjusted (increased and reduced).

The length adjusting mechanism M1 should preferably have a stopper mechanism for allowing the gear of the length adjusting member 22*e* to rotate in a direction to contract the frames 22*c* and locking the gear against rotation in the opposite direction. The length adjusting mechanism M1 should also preferably have an operating member (hereinafter referred to as "stopper canceling member") for canceling the locking of the gear against rotation (stopper) by the stopper mechanism in response to an operation of the user. Inasmuch as the second fastening band 22 is not extended unless the stopper is canceled by operating the stopper canceling member, the second fastening band 22 of the HMD1 is mounted in position with increased stability. In the example illustrated in FIG. 4, the rear support 22a includes a stopper canceling member 22f exposed on its rear surface. The stopper canceling member 22f is coupled to a stopper which is held in engagement with the gear disposed between the racks 22d for preventing the gear from rotating. The stopper is released out of engagement with the gear when the stopper canceling member 22f is operated (pushed or slid).

The first fastening band 21 should also preferably be adjustable in length. A length adjusting mechanism for the first fastening band 21 may include a surface fastener, a buckle, or a ratchet mechanism, for example. According to an example of the first fastening band 21, the length adjusting mechanism is provided on each of the right and left sides of the first fastening band 21, thereby preventing the elastic force of the first fastening band 21 from becoming uneven on the right and left sides of the first fastening band 21. In the example illustrated in FIG. 1, the foremost portion of the first fastening band 21 is supported by a pin (not illustrated) mounted on the front support 23, and the first fastening band 21 has an adjuster 21a reversed rearwardly and folded back from the pin. The adjuster 21a is detachably disposed on a side of the first fastening band 21. A surface fastener, for example, is attached to the side of the side of the first fastening band 21 and the adjuster 21a. By adjusting the length of the adjuster 21a (the length from the pin to the end of the adjuster 21a), it is possible to adjust the length of the first fastening band 21 (the size of the annular shape made up of the front support 23 and the first fastening band 21). This can increase or reduce the range in which the first fastening band 21 made of the above material (the elastically expandable material) is expandable.

The HMD 1 according to the example described herein has the front support 23 as described above. As illustrated in FIG. 1, the front support 23 is coupled to an upper portion of the display unit 10. The front support 23 extends upwardly and rearwardly obliquely from the display unit 10. When the HMD 1 is in use, the front support 23 is held against the forehead of the user (see FIG. 2). The front support 23 is less expandable than the first fastening band 21 and more rigid than the first fastening band 21. As illustrated in FIG. 1, the front support 23 is preferably formed in a plate-like shape and curved so that its central portion along the left-right directions bulges forwardly, thereby making itself mountable on the forehead of the user with increased stability. Preferably, a cushion 23f (see FIG. 3) is attached to a rear surface of the front support 23 (a surface to be held against the forehead of the user).

The first fastening band 21 and the second fastening band 22 extend rearwardly from the front support 23. Specifically, the fastening bands 21 and 22 are connected to the left and right side portions of the front support 23. According to an example of the HMD 1, as illustrated in FIG. 2, each of the first fastening band 21 and the second fastening band 22 is connected to the front support 23. According to another example of the HMD 1, the second fastening band 22 may be connected to the front support 23, and the first fastening band 21 may be connected to sides (specifically, the frames 22c) of the second fastening band 22. As described in detail later, the display unit 10 is adjustable in its position relative to the front support 23. According to this structure wherein the fastening bands 21 and 22 are directly or indirectly connected to the front support 23 rather than the display unit 10, the user is able to adjust the position of the display unit 10 while the HMD 1 is being mounted on its head using the front support 23 and the fastening bands 21 and 22.

In the example of the HMD 1, as illustrated in FIG. 1, the front support 23 is formed in a plate-like shape and the fastening bands 21 and 22 are connected to right and left edges of the front support 23. Particularly, the front support 23 has a joint 23g disposed centrally on its lower end and coupled to the display unit 10. The front support 23 also has a plate-like main body 23a extending upwardly from the joint 23g and spreading along the rightward and leftward directions. When the HMD 1 is in use, the main body 23a is held against the forehead of the user. As illustrated in FIG. 1, the main body 23a should preferably be curved so that its central portion along the left-right directions bulges forwardly. The main body 23a thus arranged is disposed along the forehead of the user when the HMD 1 is in use, increasing the stability with which the HMD 1 is mounted in place. The fastening bands 21 and 22 are connected to right and left edges of the main body 23a. With this structure, since the force by which the fastening bands 21 and 22 hold the head is easier to act on the main body 23a in other words, the forehead of the user, the stability with which the HMD 1 is mounted in place is further increased. The second fastening band 22 may be connected to the right and left edges of the main body 23a of the front support 23, whereas the first fastening band 21 may be connected to the sides (specifically, the frames 22c) of the second fastening band 22. In this case, too, the force by which the fastening bands 21 and 22 hold the head is easier to act on the forehead of the user, increasing the stability with which the HMD 1 is mounted in place.

In the example of the HMD 1, as described above, each of the first fastening band 21 and the second fastening band 22 extends rearwardly from the front support 23. This structure makes it easier to keep the length of the first fastening band 21 than a structure wherein the first fastening band 21 is connected to the frames 22c of the second fastening band 22, for example. As a result, since the first fastening band 21 is allowed to expand by an increased amount, it is easier to tentatively secure the HMD 1 using the first fastening band 21. For example, the user can mount the first fastening band 21 on its head by expanding the first fastening band 21 without using the adjuster 21a. As illustrated in FIG. 1, the second fastening band 22 in the example described herein extends rearwardly from the lower portion 23b of the main body 23a of the front support 23. The first fastening band 21 extends rearwardly from a position higher than the position where the second fastening band 22 is connected. In the exampled described herein, the first fastening band 21 extends rearwardly from an upper portion 23c (see FIG. 1) of the main body 23a of the front support 23. According to an example of the second fastening band 22, the frames 22c may be integrally formed with the lower portion 23b of the main body 23a, thereby simplifying the structure of the mount 20.

As illustrated in FIG. 2, in the example of the HMD 1, the first fastening band 21 and the second fastening band 22 extend rearwardly and downwardly from the front side of the HMD 1. More specifically, the first fastening band 21 and the second fastening band 22 extend rearwardly and downwardly obliquely from the front support 23. In other words, the direction along which the first fastening band 21 extends and the direction along which the second fastening band 22 extends are inclined to a horizontal direction H so that the positions of their rear portions are lower than the positions of their front portions. Here, the horizontal direction H is a direction perpendicular to the display device 11. The head of the user generally has a portion bulging rearwardly. The fastening bands 21 and 22 thus arranged make it possible to have their rear portions placed on a lower portion (a position lower than the bulging portion) of the rear side of the head of the user. As a consequence, even if the display unit 10 is heavy, the position of the display unit 10 is prevented from being lowered because the positions of the rear portions of the fastening bands 21 and 22 do not move upwardly as they are caught by the bulging portion of the head. In the example described herein, the rear support 22a of the second fastening band 22 is held against the lower portion of the rear side of the head of the user.

In the example of the HMD 1, the second fastening band 22 is positioned beneath the first fastening band 21. Therefore, the rear portion of the second fastening band 22 can reliably be caught by the bulging portion of the head compared with a structure wherein the second fastening band 22 is positioned above the first fastening band 21. The second fastening band 22 is made of a material less expandable than the first fastening band 21 and has the mechanism M1 for adjusting its own length. Consequently, the second fastening band 22 can hold the head of the user more firmly than the first fastening band 21. Since the rear portion of the second fastening band 22 which has such high holding power is reliably caught by the bulging portion of the head, the position of the display unit 10 is more reliably prevented from being lowered. As illustrated in FIG. 2, in the example of the HMD 1, the rear portion of the second fastening band 22 has a lower end 22g disposed at a position lower than the lower surface of the display unit 10. In the example of the HMD 1, the second fastening band 22 is inclined more downwardly than the first fastening band 21.

The first fastening band 21 and the second fastening band 22 may not necessarily be limited to the above layout. For example, the second fastening band 22 may be positioned upwardly of the first fastening band 21. In this case, the first fastening band 21 may extend rearwardly and downwardly obliquely from the front side of the HMD 1, whereas the second fastening band 22 may extend horizontally.

As described above, the second fastening band 22 in the example described herein has the rear support 22a in its rear portion. The rear support 22a has the case 22h housing the length adjusting mechanism M1 therein. This structure increases the weight of the rear portion of the second fastening band 22 compared with a structure wherein a length adjusting mechanism is provided on a side of the second fastening band 22, for example. As a result, it is easy to keep a balance between the weight of the front portion (display unit 10) of the HMD 1 and the weight of the rear portion of the HMD 1, preventing the position of the display unit 10 from being lowered.

As illustrated in FIG. 4(a), the second fastening band 22 in the example has counterweights 22i in its rear portion. This structure makes it easy to increase the weight of the rear portion of the second fastening band 22. In the example illustrated in FIG. 4(a), the counterweights 22i are housed in the case 22h. The plural (two in the example illustrated in FIG. 4(a)) counterweights 22i that are disposed in the case 22h are horizontally spaced from each other. In the example illustrated in FIG. 4(a), the counterweights 22i are disposed in right and left portions of the case 22h. According to an example, the counterweights 22i include members separate from the case 22h, and should preferably be made of a material different from the case 22h. More specifically, the counterweights 22i are made of a material which is denser than the material of the case 22h. This makes it easier to increase the weight of the rear portion of the second fastening band 22. For example, the material of the counterweights 22i is a metal. However, the material of the counterweights 22i is not limited to a metal, but may be the same as the material of the case 22h, for example. The counterweights 22i may be integrally formed with the case 22h. Counterweights may be mounted on the rear portion of the first fastening band 21. In this case, it is also easy to keep a balance between the weight of the front portion (display unit 10) of the HMD 1 and the weight of the rear portion of the HMD 1.

As described above, the mount 20 has the front support 23 on its front side. The front support 23 is connected to the upper portion of the display unit 10. The display unit 10 is movable along the anterior-posterior directions relatively to the mount 20, i.e., the front support 23, thereby allowing the user to adjust the distance between the display device 11 and the eyes. When the user moves the display unit 10 forwardly, the user can see downwardly while keeping the HMD 1 mounted on the head. For example, if the HMD 1 is used in playing a game, then the user can see a game controller held by hands.

Figure 5:
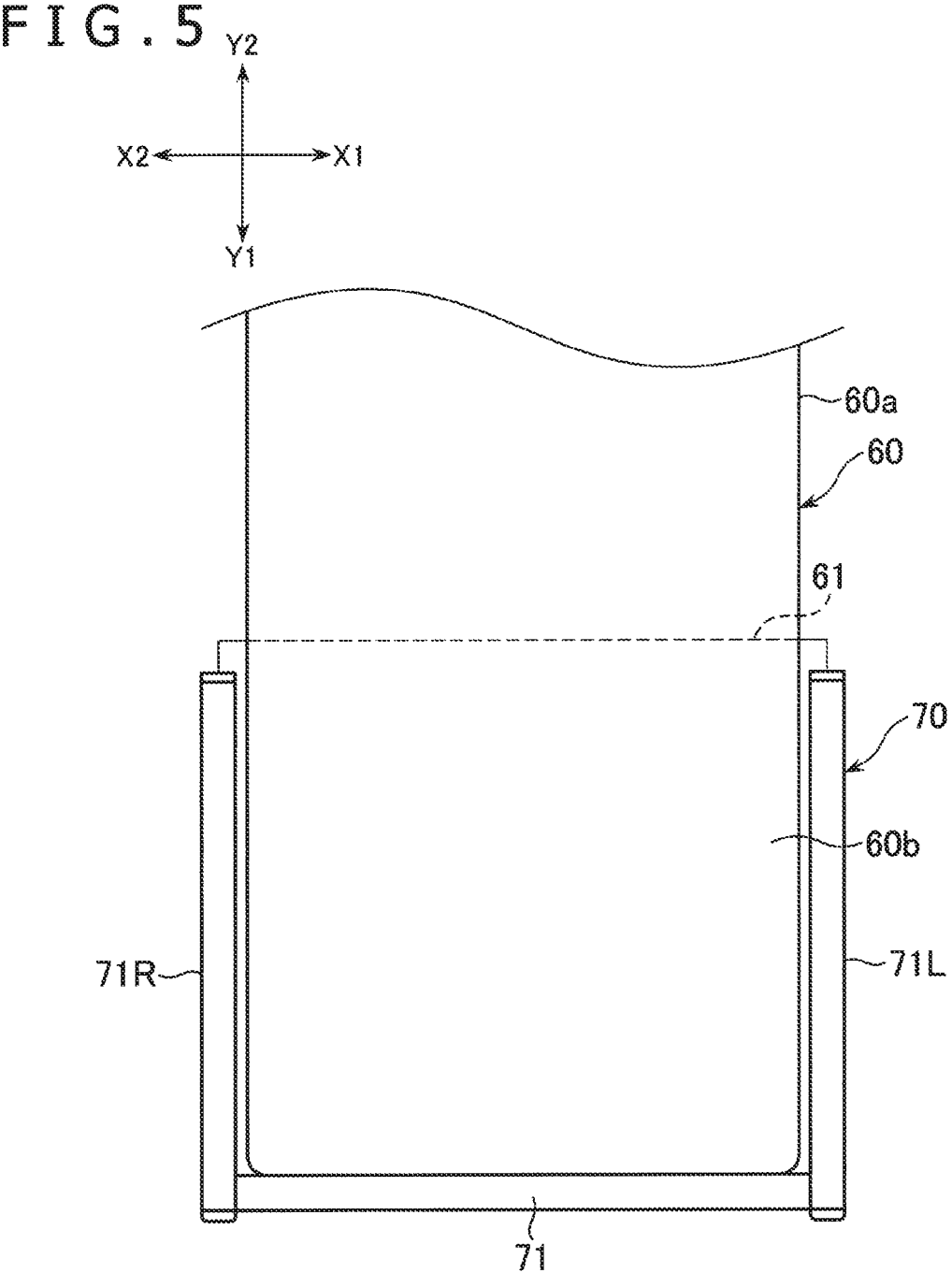
FIG. 5 is a plan view of a mechanism for guiding a display unit along directions of relative movement.
Figure 6:
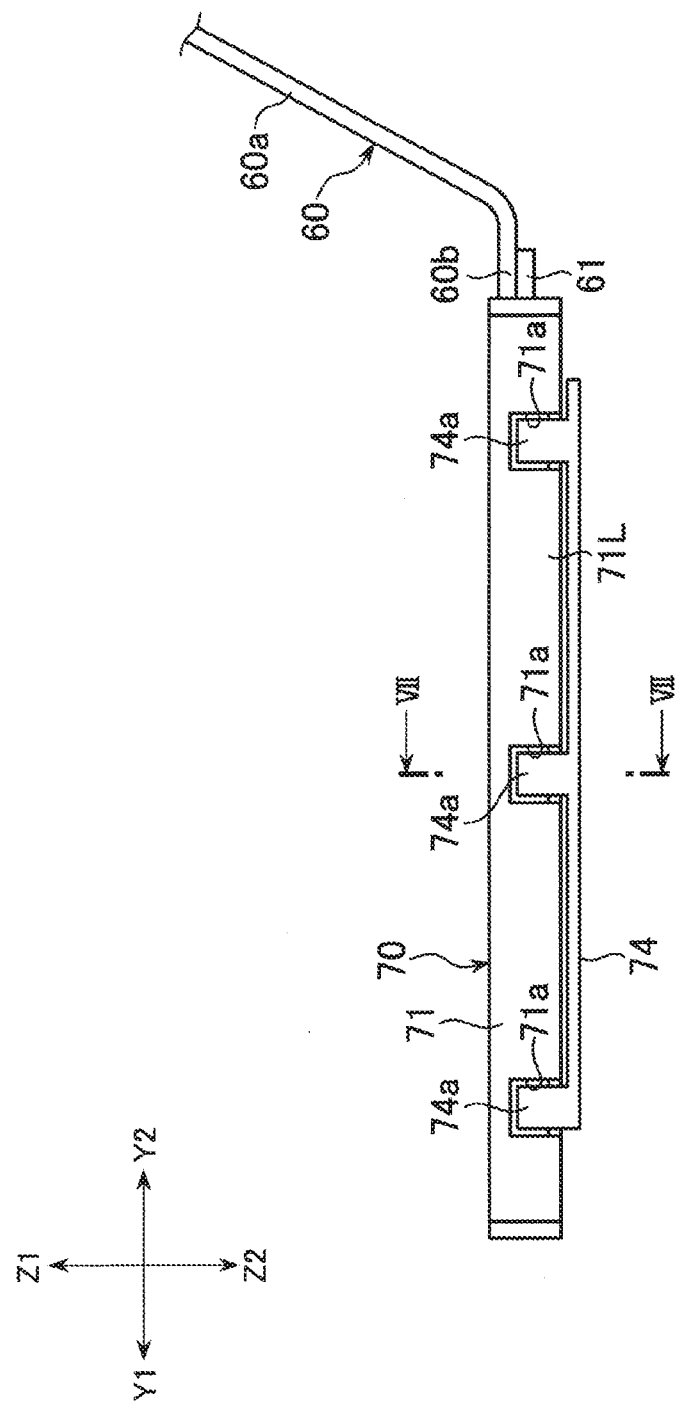
FIG. 6 is a side elevational view of the mechanism illustrated in FIG. 5.
Figure 7:
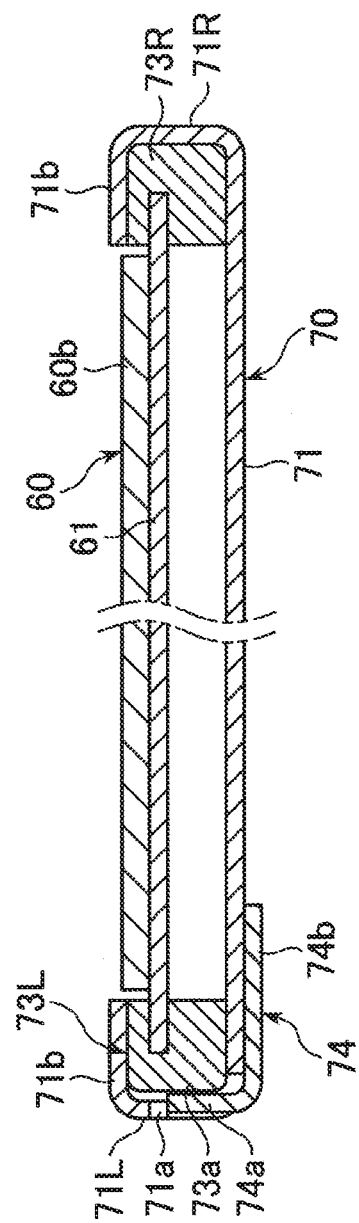
FIG. 7 is a cross-sectional view taken along line VII-VII of FIG. 6.

FIGS. 5 through 7 are views illustrating a mechanism for guiding the display unit 10 along directions of relative movement. These figures illustrate a first guide 61 provided on the mount 20 and a second guide 70 provided on the display unit 10. FIG. 5 is a plan view, FIG. 6 a side elevational view, and FIG. 7 a cross-sectional view taken along line VII-VII of FIG. 6.

The mount 20 has a plate-like frame 60. The frame 60 has a fixture 60a fixed in the front support 23. The first guide 61 is provided on the frame 60. Specifically, the frame 60 has a support 60b extending forwardly from the fixture 60a. The first guide 61 is mounted on the support 60b. The first guide 61 and the support 60b are disposed on an upper portion of the housing 14 of the display unit 10. The display unit 10 has the second guide 70 on the upper portion of the housing 14. The second guide 70 guides the first guide 61 for movement along the anterior-posterior directions.

As illustrated in FIG. 7, the second guide 70 has a base 71. According to an example of the second guide 70, the base 71 is of a plate-like shape. The first guide 61 is disposed above the base 71, for example. The first guide 61 may be disposed below the base 71. The base 71 has side guides 71R and 71L on its right and left sides. The first guide 61 is disposed between the two side guides 71R and 71L. Specifically, the right side guide 71R and the left side guide 71L are positioned respectively on the right and left sides of the first guide 61, and extend along the edges of the first guide 61. The side guides 71R and 71L and the base 71 are integrally formed of a metal, for example.

The second guide 70 has guide rails formed separately from the side guides 71R and 71L and the base 71. The second guide 70 has guide rails 73R and 73L respectively on the right and left sides thereof. The guide rails 73R and 73L are disposed between the side guides 71R and 71L and the edges of the first guide 61. The guide rails 73R and 73L are made of a resin such as plastics, for example. The first guide 61 is also made of a resin such as plastics, for example. The guide rails 73R and 73L may be made of a metal. As illustrated in FIG. 7, the guide rails 73R and 73L may be formed in vertically sandwiching relation to the edges of the first guide 61, thereby reducing friction between the first guide 61 and the second guide 70.

The guide rail 73L has a portion 73b (see FIG. 7) capable of bearing a force directed toward the edge of the first guide 61 from an outer side (specifically, a left side) of the guide rail 73L in the horizontal directions (the portion will hereinafter be referred to as "pressed portion 73b"). The guide rail 73L has the pressed portion 73b disposed midway along its longitudinal directions. Preferably, the guide rail 73L should have a plurality of pressed portions 73b spaced from each other along its longitudinal directions.

As illustrated in FIG. 6, the side guides 71R and 71L are of a wall-like shape, and are disposed along the guide rails 73R and 73L. The side guide 71L has a hole 71a defined therein through which a portion of the side surface of the guide rail 73L is exposed. The guide rail 73L can be pressed toward the edge of the first guide 61 through the hole 71a in the side guide 71L. In other words, a portion of the side surface of the guide rail 73L which corresponds to the hole 71a serves as the pressed portion 73b. The side guide 71L may have a plurality of holes 71a spaced from each other along the longitudinal directions of the guide rail 73L.

The base 71 and the guide rail 73L are arranged so that the position of the guide rail 73L can be slightly moved along the horizontal directions before a fixed member 74 to be described later is fixed to the second guide 70. The position of the guide rail 73L along the horizontal directions is secured by a separate member from the base 71 and the guide rail 73L. The member which secures the position of the guide rail 73L should preferably have a portion held in contact with the pressed portion 73b. The position of the guide rail 73L along the horizontal directions is secured while the guide rail 73L is held in contact with the edge of the first guide 61. The "separate member" referred to above includes a structure (e.g., a screw or a fixed member to be described later) or a material (e.g., an adhesive) which can be moved separately from the base 71 and the guide rail 73L before it is used to secure the guide rail 73L.

As described above, the second guide 70 has the base 71 having the side guides 71R and 71L and the guide rail 73L positioned between the side guide 71L and the edge of the first guide 61. The guide rail 73L has the pressed portion 73b capable of bearing a force directed toward the first guide 61 from the outer side in the horizontal directions. The second guide 70 has the separate member from the base 71 and the guide rail 73L for securing the position of the guide rail 73L with respect to the base 71 along the horizontal directions.

The second guide 70 of the above structure can be manufactured as follows: The guide rails 73R and 73L are placed inwardly of the side guides 71R and 71L. Thereafter, the first guide 61 is placed between the guide rails 73R and 73L. While the pressed member 73b of the left side guide rail 73L is being pushed toward the edge of the first guide 61, the position of the guide rail 73L along the horizontal directions is secured by the separate member from the base 71 and the guide rail 73L. In this manner, the distance between the guide rails 73R and 73L can be matched to the width of the first guide 61, allowing the first guide 61 to move linearly along the anterior-posterior directions.

As illustrated in FIGS. 6 and 7, the second guide 70 has the separate fixed member 74 from the base 71 and the guide rail 73L. The fixed member 74 has pressing portions 74a. The pressing portions 74a are positioned in the holes 71a in the side guide 71L and held in contact with the pressed portions 73b of the guide rail 73L. The fixed member 74 has a fixed portion 74b that is fixed to the base 71. The fixed member 74 thus constructed makes it easy to secure the position of the guide rail 73L.

The fixed portion 74b is of a plate-like shape, for example. The pressing portions 74a project upwardly or downwardly from the edge of the fixed portion 74b. The fixed member 74 has the plural pressing portions 74a spaced from each other along the lengthwise directions of the guide rail 73L. As illustrated in FIG. 7, the fixed portion 74b is disposed on the lower surface of the base 71 and fixed to the base 71. The fixed portion 74b is welded to the base 71, for example. The fixed portion 74b may be fused or bonded to the base 71. The guide rail 73L may be fixed to the base 71 by an adhesive rather than the plate-like fixed member 74. For example, an adhesive may be introduced through the holes 71a to fill the space between the guide rail 73L and the side guide 71L. The adhesive which is solidified functions as a fixed member.

As described above, the base 71 and the guide rail 73L are arranged so that the position of the guide rail 73L can be slightly moved along the horizontal directions. For example, the base 71 has holes defined therein and the guide rail 73L has protrusions fitted in the holes. The size of the holes along the horizontal directions is slightly larger than the size of the protrusions of the guide rail 73L. Before the position of the guide rail 73L is secured by the fixed member 74, therefore, the position of the guide rail 73L can be slightly moved. As illustrated in FIG. 7, the side guide 71L has a retaining wall 71b. The guide rail 73L is vertically sandwiched by the base 71 and the retaining wall 71b. Consequently, before the position of the guide rail 73L is secured by the fixed member 74, the guide rail 73L is retained by the base 71 while being slightly movable.

The side guide 71R is of the same structure as the side guide 71L except that the side guide 71L has the holes 71a defined therein. The side guide 71R may also have holes 71a defined therein. In the example described above, the second guide 70 which has the guide rails 73L and 73R and the fixed member 74 is provided on the display unit 10, and the first guide 61 is provided on the mount 20. However, the second guide 70 which has the guide rails 73L and 73R and the fixed member 74 may be provided on the mount 20, and the first guide 61 may be provided on the display unit 10.

Figure 8:
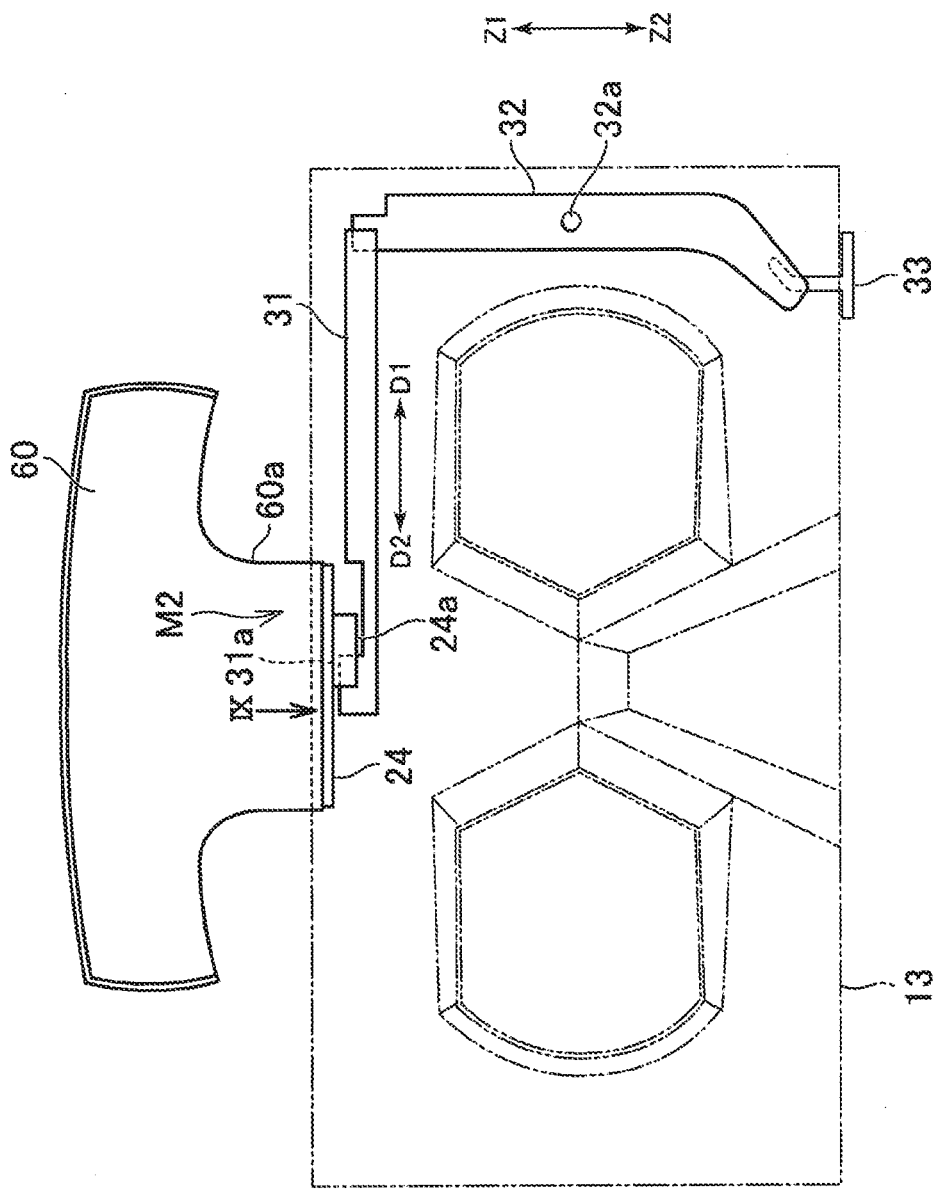
FIG. 8 is a schematic view illustrating a mechanism for locking the display unit and a mount against relative movement along the anterior-posterior directions.
Figure 9:
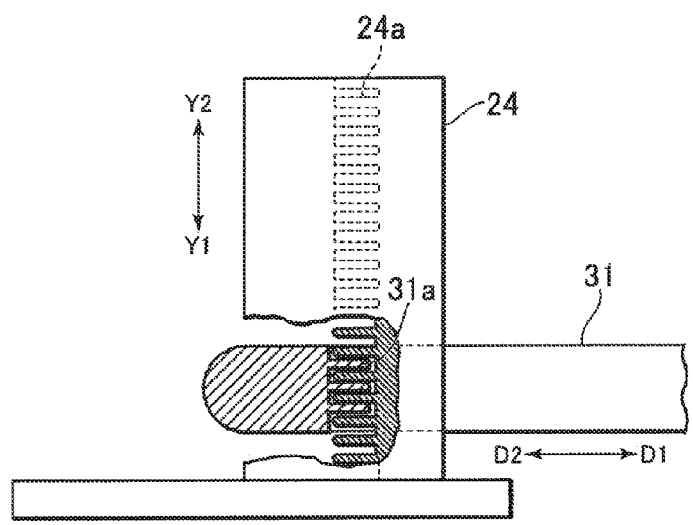
FIG. 9 is a view of the mechanism illustrated in FIG. 8, as viewed along the direction IX in FIG. 8, illustrating a locking member and a locked member.

FIGS. 8 and 9 are schematic views illustrating a mechanism for locking the display unit 10 and the mount 10 against relative movement along the anterior-posterior directions (the mechanism will hereinafter be referred to as "position adjusting mechanism M2"). FIG. 9 is a view of the position adjusting mechanism M2, as viewed along the direction IX in FIG. 8, illustrating a locking member 24 and a locked member 31.

According to an example of the HMD 1, the locking member 24 may be mounted on the frame 60. The locking member 24 and a lower portion (the support 60b described above) of the frame 60 are coupled to the display unit 10. The locking member 24 and the lower portion of the frame 60 are guided for movement relative to the display unit 10 by the second guide 70 described above which is provided on the display unit 10.

The display unit 10 in the example illustrated in FIG. 8 has the locked member 31 on an upper portion thereof. According to an example of the position adjusting mechanism M2, as illustrated in FIG. 9, the locking member 24 has an engaging portion 24a on a lower side thereof. The engaging portion 24a includes a plurality of combtooth-shaped convexities arrayed along the anterior-posterior directions (Y1-Y2 directions). The locked member 31 is disposed on a lower side of the locking member 24 and has an engaged portion 31a formed on an upper side thereof. The engaged portion 31a also includes a plurality of convexities which engage the plural convexities composing of the engaging portion 24a. The locked member 31 is movable between a locked position and an unlocked position. The locked position refers to the position of the locked member 31 illustrated in FIG. 8. When the locked member 31 is in the locked position, the engaged portion 31a of the locked member 31 engages the engaging portion 24a of the locking member 24, preventing the locking member 24 and the frame 60 from moving relatively to the display unit 10. The unlocked position refers to a position spaced in the leftward direction (D2 direction in FIG. 8) from the position of the locked member 31 illustrated in FIG. 8. When the locked member 31 is in the unlocked position, the engaged portion 31a of the locked member 31 disengages from the engaging portion 24a of the locking member 24, allowing relative movement of the display unit 10.

The display unit 10 in the example illustrated in FIG. 8 has a lock canceling member 33 responsive to a user's operation. The lock canceling member 33 is provided on a lower surface of the display unit 10 (see FIG. 3). The display unit 10 has a joint member 32 for transmitting movement of the lock canceling member 33 to the locked member 31. The joint member 32 has an upper end coupled to the locked member 31 and a lower end coupled to the lock canceling member 33. The locked member 31 is moved between the locked position and the unlocked position in response to movement of the lock canceling member 33. The joint member 32 in the example illustrated herein includes a lever movable about a shaft 32a. When the lock canceling member 33 slides in the rightward direction (D1 direction in FIG. 8) while the locked member 31 is in the locked position, the locked member 31 moves in the leftward direction (D2 direction in FIG. 8) toward the unlocked position. The display unit 10 can now be adjusted in its relative position with respect to the front support 23 (more specifically, the frame 60). Since the locked member 31 is biased toward the locked position, when the force tending to cause the locked member 31 to slide in the rightward direction (D1 direction in FIG. 8) is canceled, the locked member 31 moves in the rightward direction toward the locked position, and the lock canceling member 33 moves in the opposite leftward direction (D2 direction in FIG. 8). The relative position of the display unit 10 with respect to the front support 23 is now prevented from being adjusted.

According to the example of the HMD 1, the position adjusting mechanism M2 is able to switch between a state wherein the position of the display unit 10 with respect to the front support 23 can be adjusted and a state wherein the position of the displayed unit 10 with respect to the front support 23 is prevented from being adjusted in response to the operation of the lock canceling member 33 by the user.

As illustrated in FIG. 3, a light shielding member may be mounted on the display unit 10. The light shielding member should preferably be made of a flexible material. For example, the light shielding member is made of an elastomer.

As illustrated in FIG. 3, the display unit 10 has side guards 41 extending rearwardly from the sides of the display unit 10 as an example of the light shielding member. The side guards 41 block light on the right and left sides of the HMD 1 when the HMD 1 is in use.

As illustrated in FIG. 3, the frame 13 of the display unit 10 has openings 13a defined in the right and left sides of a rear surface thereof. The lenses 12 and the display device 11 are disposed on the inside of the openings 13a. The user can see images displayed on the display device 11 through the openings 13a. A recess 13b which is open rearwardly and downwardly is defined between the left and right openings 13a. When the HMD 1 is in use, the nose of the user is positioned in the recess 13b. As illustrated in FIG. 3, a light shielding member 42 may also be disposed in the recess 13b. According to an example of the light shielding member 42, the light shielding member 42 is disposed so as to cover the inside of the recess 13b when the display unit 10 is viewed from behind. The light shielding member 42 prevents ambient light from reaching the eyes of the user through the gap between the inner surface of the recess 13b and the nose of the user when the HMD 1 is in use.

According to an example of the light shielding member 42, as illustrated in FIG. 3, the light shielding member 42 is of a sheet-like shape covering (closing) the recess 13b. The sheet-like light shielding member 42 is formed of a flexible material, for example. As illustrated in FIG. 3, the light shielding member 42 may be integrally formed with the side guards 41. The light shielding member 42 may be a member separate from the side guards 41, which is mounted on the frame 13 of the display unit 10. In this case, the light shielding member 42 may be detachably mounted on the frame 13. The light shielding member 42 thus arranged makes it possible to vary the position of the light shielding member 42 in the recess 13b, or stated otherwise, the position of the light shielding member 42 along the anterior-posterior directions, depending on the size of the nose of the user. In the example illustrated in FIG. 3, the light shielding member 42 is of a sheet-like shape and has a slit 42c defined centrally therein which extends vertically. The light shielding member 42 thus constructed prevents itself from obstructing the way in which the HMD 1 is comfortably mounted when the HMD 1 is in use.

According to another example of the light shielding member 42, the light shielding member 42 is formed of a cushioning material and disposed in covering relation to the inside of the recess 13b. Stated otherwise, the cushioning light shielding member 42 is disposed in the recess 13b and attached to the inner surface of the recess 13b. The light shielding member 42 thus arranged also prevents ambient light from reaching the eyes of the user through the gap between the inner surface of the recess 13b and the nose of the user.

Figure 10:
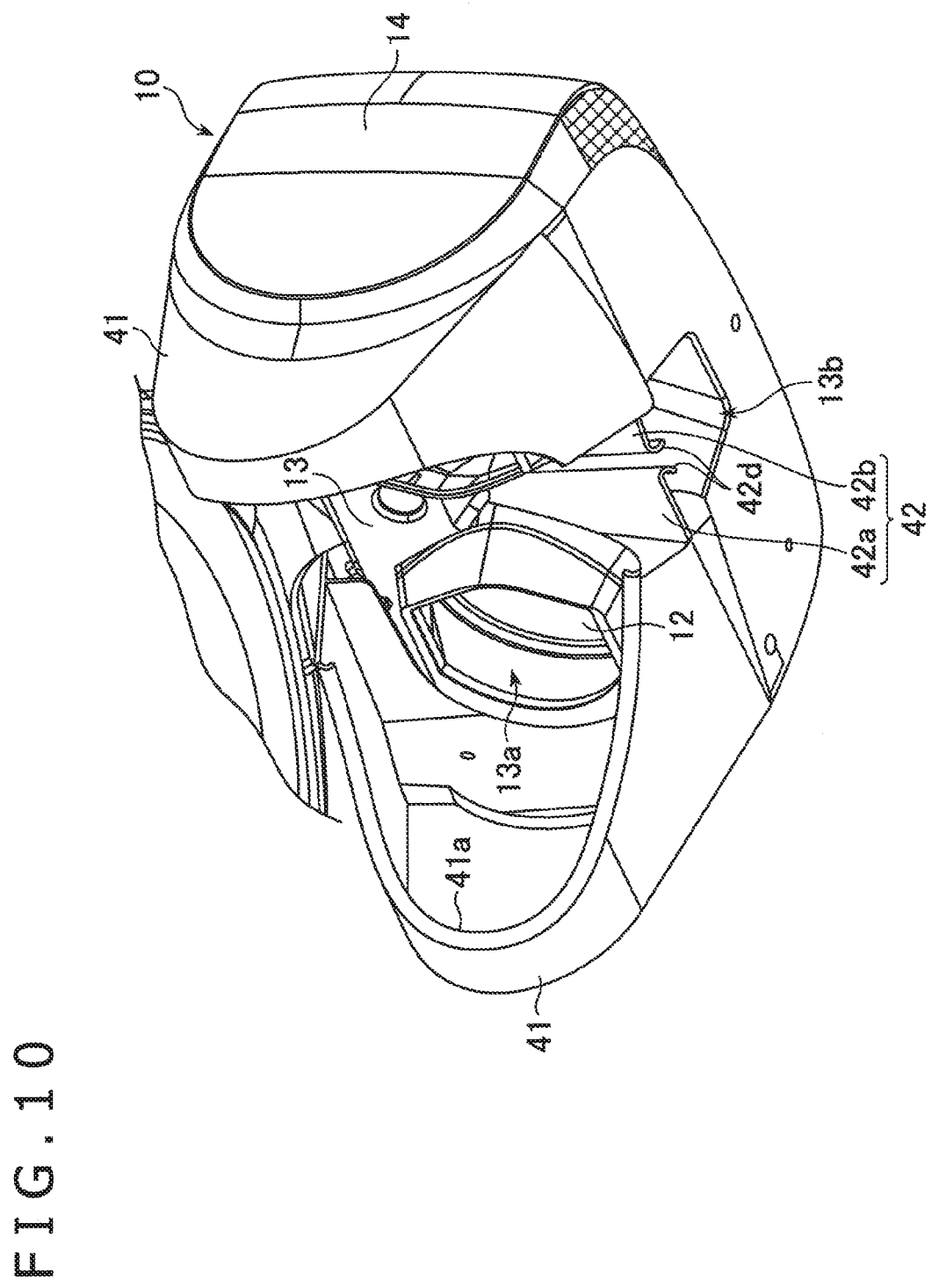
FIG. 10 is a view illustrating a modification of a light shielding member.

FIG. 10 is a view illustrating a modification of the light shielding member. In the example illustrated in FIG. 10, the display unit 10 has the side guards 41 and the light shielding member 42. In the illustrated example, the side guards 41 have curved edges 41a. The curved edges 41a reduce the discomfort which is caused by the edges 41a of the side guards 41 that are pressed against the face of the user when the HMD 1 is mounted on the head. The light shielding member 42 has a right side portion 42a and a left side portion 42b opposite the slit 42c. The right side portion 42a and the left side portion 42b should preferably have curved edges 42d. The curved edges 42d reduce the discomfort which is caused by the edges 42d of the light shielding member 42 that are pressed against the nose of the user when the HMD 1 is mounted on the head.

The mount 20 may have a front pad on its front side for contacting the front side of the head of the user. The front pad should preferably have a cushion. The front pad is provided on the rear side of the upper portion 23c of the front support 23. The front pad should preferably be supported in a manner to make the angle of the front pad in the anterior-posterior directions adjustable. The front pad thus arranged makes it possible to vary the angle of the front pad depending on the shape and size of the head of the user.

FIG. 11 is a set of views illustrating an example of a structure which is capable of adjusting the angle of a front pad 25. FIG. 11(a) is a side elevational view, partly cut away, of the front pad 25. FIG. 11(b) is a plan view of the front pad 25.

The front pad 25 has a bracket 25a. The bracket 25a is formed of a material that is of relatively high rigidity, such as plastics or metal. According to an example of the front pad 25, the bracket 25a is of a plate-like shape. A cushion 25b referred to above is attached to the bracket 25a. The bracket 25a has shafts 25c on its right and left sides. The shafts 25c are supported in the front support 23, for example. The shafts 25c are positioned on a lower portion of the front pad 25 as viewed in side elevation. An upper portion of the front pad 25 can move about the shafts 25c in the anterior-posterior directions, thereby making it possible to adjust the angle of the front pad 25.

As illustrated in FIG. 11(b), the mount 20 has an operating member 27 for the user to move the front pad 25. The operating member 27 is housed in the front support 23. The operating member 27 is supported for sliding movement along the horizontal directions. The bracket 25a has pressed portions 25d projecting forwardly. The operating member 27 has pressing surfaces 27a for pressing the pressed portions 25d. The pressing surfaces 27a are inclined to vary the position of the pressed portions 25d of the bracket 25a in the anterior-posterior directions depending on the position of the operating member 27 in the horizontal directions. The operating member 27 has an operating portion 27b exposed on the outer surface of the front support 23. With this structure, when the user moves the position of the operating member 27 along the horizontal directions through the operating portion 27b, the angle of the front pad 25 is varied.

The HMD 1 in the example described herein has a plurality of light emitters 51 which include light-emitting elements such as LEDs or the like. As described later, when the HMD 1 is in use, an information processing apparatus to which the HMD 1 is connected detects the positions of the plural light emitters 51 through a camera, for thereby detecting the orientation of the head of the user and controlling images displayed on the display device 11 and objects displayed on the display device 11 depending on the orientation of the head. According to an example of the HMD 1, as illustrated in FIGS. 1 and 2, the plural light emitters 51 are disposed in spaced apart relation to each other on the display unit 10 (in FIGS. 1 and 2, the light emitters 51 are illustrated hatched for clarification). In the illustrated example, the plural light emitters 51 are disposed in outer peripheral regions of the front surface of the display unit 10. Since the spacing between the light emitters 51 thus arranged is large, the accuracy with which to detect the orientation of the head is increased. In the example illustrated in FIGS. 1 and 2, four light emitters 51 are disposed on the four corners of the front surface of the display unit 10. More specifically, in the example illustrated in FIGS. 1 and 2, the light emitters 51 are disposed on the four corners of the front surface so that the light emitters 51 extend over both the front and side surfaces of the display unit 10. Stated otherwise, the light emitters 51 are disposed obliquely to the front surface of the display unit 10 so as to face the outer sides of the outer edges of the front surface of the display unit 10. With this layout of the light emitters 51, it is easy for the information processing apparatus to detect light from the light emitters 51 through the camera. For example, even when the user faces in a direction different from the direction of the camera, the information processing apparatus can detect light from the light emitters 51.

According to an example of the HMD 1, as illustrated in FIG. 4(a), the HMD 1 has light emitters 51 on its rear portion (in FIG. 4(a), the light emitters 51 are illustrated hatched for clarification). In the example illustrated in FIG. 4(a), the plural (two in FIG. 4(a)) light emitters 51 are provided on the rear support 22a of the second fastening band 22. The plural light emitters 51 are spaced from each other in the horizontal directions. With this layout of the light emitters 51, it is easy to detect light from the light emitters 51 through the camera. For example, even when the head of the user faces in a direction opposite to the direction of the camera, light from the light emitters 51 can be detected.

The layout of the light emitters 51 is not limited to those described above, but may be modified appropriately. For example, the display unit 10 may have only two light emitters 51 spaced from each other in the horizontal directions. Alternatively, the display unit 10 may have only two light emitters 51 spaced from each other in the vertical directions. The light emitters 51 may not necessarily be provided on the rear support 22a.

Figure 12:
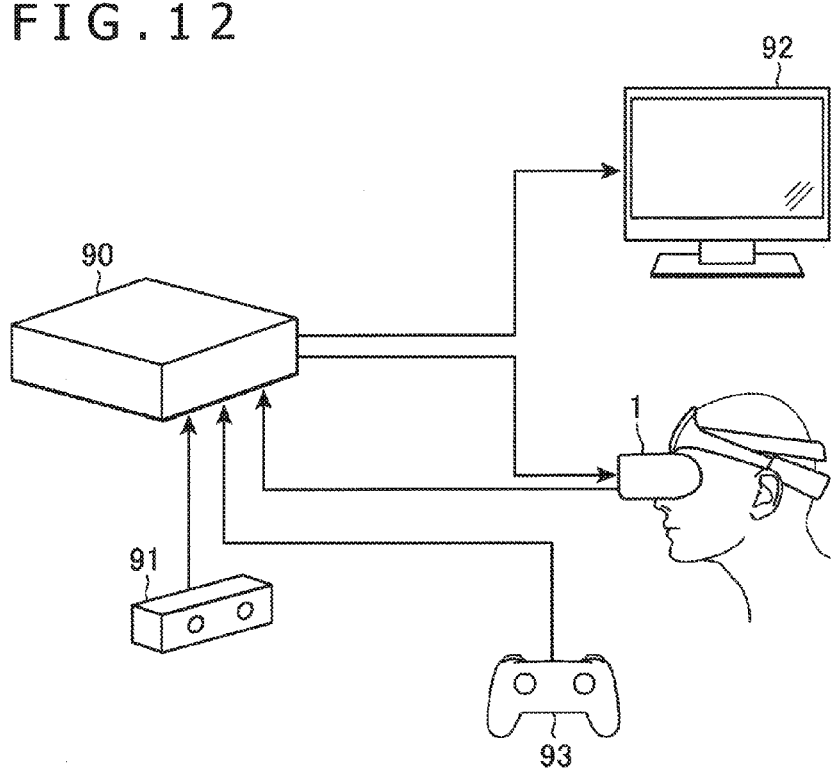
FIG. 12 is a view illustrating an example of the manner in which the head-mounted display is used.

FIG. 12 is a view illustrating an example of the manner in which the HMD 1 is used. A camera 91 is connected to an information processing apparatus 90. As described above, the information processing apparatus 90 detects the positions of the plural light emitters 51 through the camera 91, and detects the orientation of the head of the user on the basis of the positions of the plural light emitters 51. In the example of the manner in which the HMD 1 is used, the information processing apparatus 90 generates or corrects a moving-image signal depending on the orientation of the user, and outputs the moving-image signal to the HMD 1. The information processing apparatus 90 may output a moving-image signal to a display device 92 such as a television or the like in addition to the HMD 1. In this case, the moving-image signal output to the HMD 1 and the moving-image signal output to the display device 92 may be different from each other. For example, the information processing apparatus 90 may output a moving-image signal for a two-dimensional image to the display device 92, and may output a moving-image signal for a three-dimensional image to the display device 11 of the HMD 1. The moving-image signals of those two types may be generated by a dedicated apparatus which is different from the information processing apparatus 90. The display unit 10 of the HMD 1 may be provided with sensors such as an acceleration sensor, a gyro sensor, etc. The information processing apparatus 90 may generate moving-image signals on the basis of the outputs from the sensors. The information processing apparatus 90 may generate moving-image signals on the basis of a signal from an operating device 93 which is manually operated by the user.

As described above, the HMD 1 has the first fastening band 21 and the second fastening band 22 which extend from the front side toward rear side of the HMD 1 for being fastened to the head of the user. At least a portion of the first fastening band 21 is made of an elastically expandable material. The second fastening band 22 is made of a material which is less expandable than the above material of the first fastening band 21 and includes the mechanism M1 for adjusting its length. The display unit 10 includes the display device 11 and is supported by the first fastening band 21 and the second fastening band 22. With this HMD 1, when the user is to mount the HMD 1 on its head, the user initially tentatively secures the position and attitude of the HMD 1 using the first fastening band 21, and then can adjust the length of the second fastening band 22 while the HMD 1 is being tentatively secured. Therefore, when the user adjusts the length of the second fastening band 22, the position and attitude of the HMD 1 is prevented from being varied, allowing the user to adjust the length of the second fastening band 22 easily. Furthermore, as the second fastening band 22 is made of a material less expandable than the first fastening band 21, the second fastening band 22 is mounted on the head of the user with increased stability.

The present invention is not limited to the HMD 1 described above, but can be modified in various ways.

For example, the first fastening band 21 and the second fastening band 22 may extend rearwardly from the display unit 10 rather than the front support 23. Alternatively, one of the first fastening band 21 and the second fastening band 22 may extend rearwardly from the display unit 10, whereas the other band may extend rearwardly from the front support 23.

One of the first fastening band 21 and the second fastening band 22 may extend rearwardly and upwardly obliquely from the front side of the HMD 1. One of the first fastening band 21 and the second fastening band 22 may extend rearwardly horizontally from the front side of the HMD 1.

The invention claimed is:

1. A head-mounted display comprising:
   a first fastening band for being fastened to a head of a user, the first fastening band including at least a portion made of an elastically expandable material and extending rearwardly from a front side of the head-mounted display;
   a second fastening band for being fastened to the head of the user, the second fastening band being made of a material which is less expandable than the material of the first fastening band, including a mechanism for adjusting the length of the second fastening band, and extending rearwardly from a front side of the head-mounted display; and
   a display unit including a display device and supported by the first fastening band and the second fastening band.

2. The head-mounted display according to claim 1, further comprising:
   a front support for being mounted on the forehead of the user, the front support being coupled to the display unit and adjustable in its position with respect to the display unit;
   wherein the first fastening band and the second fastening band extend rearwardly from the front support.

3. The head-mounted display according to claim 1, wherein one of the first fastening band and the second fastening band is positioned beneath the other fastening band; and
   the one of the first fastening band and the second fastening band extends rearwardly and downwardly.

4. The head-mounted display according to claim 3, wherein the second fastening band has in a rear portion of the second fastening band the mechanism for adjusting the length of the second fastening band and a case housing the mechanism.

5. The head-mounted display according to claim 3, wherein at least one of the first fastening band and the second fastening band has a counterweight in a rear portion.

6. The head-mounted display according to claim 1, wherein the second fastening band is positioned beneath the first fastening band.

* * * * *